US006659404B1

United States Patent
Roemke

(10) Patent No.: US 6,659,404 B1
(45) Date of Patent: Dec. 9, 2003

(54) OVERBOARD VENTING INFLATION SYSTEM AND CONTROL VALVE THEREFOR

(75) Inventor: Lowell W. Roemke, Tempe, AZ (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 10/328,557

(22) Filed: Dec. 23, 2002

(51) Int. Cl.[7] .............................. F16K 17/14; B64D 25/14
(52) U.S. Cl. ..................... 244/137.2; 244/905; 137/224
(58) Field of Search ............................... 244/137.2, 905; 193/25 B; 182/48; 137/68.11, 68.19, 224, 505.13, 71, 494; 220/89 A; 222/3

(56) References Cited

U.S. PATENT DOCUMENTS

| 3,693,691 | A | * | 9/1972 | Summers ..................... 137/68 |
| 4,375,877 | A | * | 3/1983 | Shorey ..................... 244/137.2 |
| 4,566,862 | A | * | 1/1986 | Halvais |
| 6,240,951 | B1 | | 6/2001 | Yori |
| 6,431,197 | B2 | * | 8/2002 | Hintzman et al. ............. 137/71 |

* cited by examiner

Primary Examiner—Galen L. Barefoot
(74) Attorney, Agent, or Firm—Jerry Holden; John D. Titus

(57) ABSTRACT

An inflation system for inflating an inflatable evacuation slide includes an enclosure containing an uninflated, stored evacuation slide. The enclosure is sealed by means of a tightly fitting enclosure door that optionally includes a seal for excluding dirt and moisture. The system also includes a source of pressurized gas comprising a conventional pyrotechnic gas generator, stored pressurized gas, or hybrid inflator. The inflation system includes an overpressure relief vent, which vents inflation gas outside of the inflatable member in the event of an overpressure condition in the gas source. The overpressure relief vent includes a directional vent connected to a conduit. The conduit passes from the overpressure relief vent to an opening in the aircraft fuselage, which allows any vented gas to be safely directed away from the inflation system enclosure.

12 Claims, 3 Drawing Sheets

OVERBOARD VENTING INFLATION SYSTEM AND CONTROL VALVE THEREFOR

BACKGROUND OF THE INVENTION

The present invention is directed toward inflation systems, in particular toward inflation systems used for inflating an inflatable member such as an emergency evacuation slide used on a commercial aircraft.

Inflatable evacuation slides are normally stored folded in an uninflated condition in a pack requiring a minimum amount of space. Typically the pack is stored in a compartment attached to or immediately adjacent the aircraft exit door. The slide is typically attached to the airframe such that if the aircraft exit door is opened in the "armed" condition, the evacuation slide will be automatically ejected and inflated. For over-wing evacuation systems, the evacuation slide is most commonly stored outside the aircraft pressure hull in an enclosure within the contour of the aircraft skin on the fuselage, wing or fairing. The enclosure has a door that fits flush with the external skin of the aircraft. The door is remotely actuated to fall away as the evacuation slide is inflated. For aerodynamic reasons it is desirable that the remotely actuated door fit tight and flush against the external skin of the aircraft. Similarly, in order to prevent water, de-icing fluids or other containments from entering the evacuation slide enclosure, it is desirable that a seal be maintained between the door and the evacuation slide enclosure.

Modern evacuation slide inflation systems typically comprise a pressure vessel containing a stored pressurized gas, either alone or in combination with a pyrotechnic gas generator, used to supply the source gas for inflation of the emergency evacuation slide. Regulations require inflation systems that use stored gas to have an overpressure relief valve to release gas in the event of overpressurization of the inflation system pressure vessel. Typically such overpressure relief valves vent excess gas through a diffuser that vents the excess gas to the atmosphere. Because of the relatively large volume inside an aircraft cabin, for cabin-mounted inflation systems, venting of an overpressure relief valve to the atmosphere does not pose any serious safety concerns. For externally mounted inflation systems, however, pressure build-up within the evacuation system enclosure resulting from the venting of an overpressure relief valve could result in a catastrophic in-flight separation of the enclosure door or enclosure itself from the aircraft. Thus, what is needed is a an inflation system having a tight, flush fitting enclosure door while at the same time having a control valve that safely vents gas from an overpressure relief valve without overpressurizing the emergency evacuation slide enclosure.

SUMMARY OF THE INVENTION

The present invention solves the foregoing need by providing an inflation system for inflating an inflatable evacuation slide that includes an overboard venting means for safely venting gas from an overpressure relief valve or other safety device without overpressurizing the enclosure or its surroundings. According to one embodiment of the invention, the inflation system comprises an enclosure containing an uninflated evacuation slide. The enclosure is sealed by means of a tightly fitting enclosure door that optionally includes a seal for excluding dirt and moisture. The system also includes a source of pressurized gas comprising a conventional pyrotechnic gas generator, stored pressurized gas, or hybrid inflator consisting of at least of at least one stored inflation gas augmented by a pyrotechnic gas generator. The inflation system includes a control valve that, in response to a trigger such as from opening an emergency evacuation door in the "armed" condition, opens to begin a flow of inflation gas from the pressure vessel to the emergency evacuation slide. The control valve may optionally include a regulator that regulates the relatively high pressure in the storage vessel down to a lower pressure for safe inflation of the emergency evacuation slide or, if aspirators are used, down to the optimum pressure for operation of the aspirators. The control valve includes an overpressure relief vent, which vents inflation gas outside of the inflatable member. In lieu of the neutral thrust overpressure relief vents used in prior art regulator valves, however, the overpressure relief vent of the present invention comprises a directional vent connected to a conduit. The conduit passes from the control valve to an opening in the aircraft fuselage, which allows any vented gas to be safely directed away from the inflation system enclosure.

BRIEF DESCRIPTION OF THE DRAWING

The present invention will be better understood from a reading of the following detailed description taken in conjunction with the accompanying drawing figures in which like references designate like elements and, in which.

DETAILED DESCRIPTION

Figure 1:
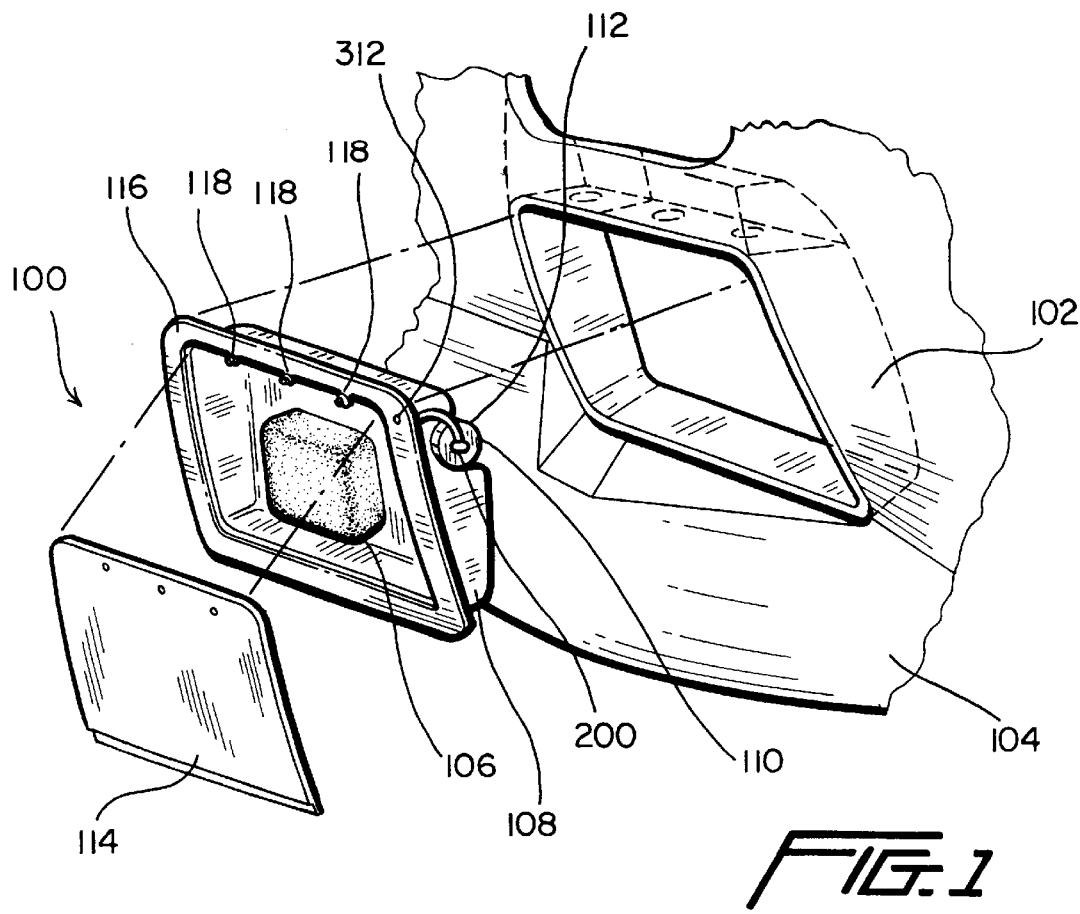
FIG. 1 is an exploded perspective view showing an inflation system incorporating features of the present invention.

The drawing figures are intended to illustrate the general manner of construction and are not necessarily to scale. In the detailed description and in the drawing figures, specific illustrative examples are shown and are herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

With reference to FIG. 1, for over-wing and other emergency evacuation slides that are not conveniently stored inside the pressure hull of an aircraft, it is desirable to install the evacuation slide system 100 in a non-pressurized compartment 102 formed in aircraft fuselage 104 outside the pressure hull of the aircraft. Evacuation system 100 comprises a folded uninflated evacuation slide 106 stored within an enclosure 108 that is suitably mounted to aircraft fuselage 104 for example by screws, rivets or the like. An inflation source 110 is attached to the rear of enclosure 108. Inflation source 110 may comprise a gas generator, stored compressed gas, or a combination thereof in which the stored compressed gas is housed within a pressure vessel 112. Inflation source 110 is connected via a control valve 200 to the inflation port of evacuation slide 106.

Enclosure door 114 fits flush into the reveal 116 of enclosure 108 to form a smooth continuous part of the exterior surface of aircraft fuselage 104. A seal is maintained between door 114 and enclosure 108 to substantially exclude moisture and dust from entering enclosure 108. Door 114 is retained by a plurality of locks 118 that are pneumatically actuated by inflation source 110 to release door 114 as evacuation slide 106 inflates and distends from enclosure 108. As can be seen from an inspection of FIG. 1, because the clearance between enclosure 108 and compartment 102 is small and because door 114 fits tightly against enclosure 108, sudden discharge of overpressure from control valve 200 (for example in the event of overcharging of pressure vessel 112 or accidental ignition of a pyrotechnic generator discharging into pressure vessel 112) could potentially cause a build up of pressure causing either door 114 to be forced open or enclosure 108 to be ejected from compartment 102.

Figure 2:
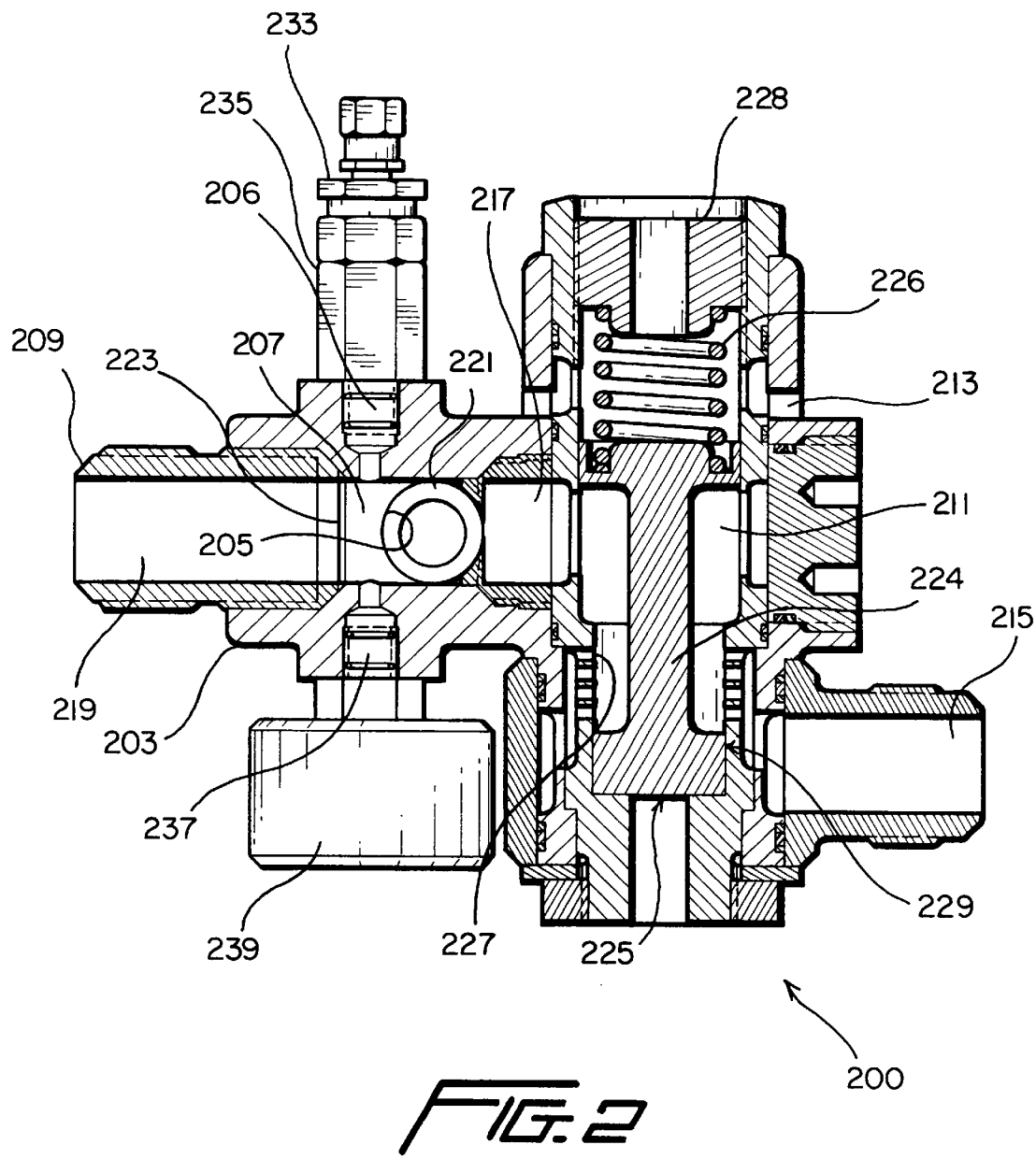
FIG. 2 is a cross-sectional view of a control valve incorporating features of the present invention.

With reference to FIG. 2, although the present invention may be implemented with a control valve that does not include a pressure regulation capability, in the illustrative embodiment, control valve 200 comprises a regulator valve having a valve body 203 with an inlet port 205, a charging port 206, a first chamber 207, a second chamber 211, a regulator vent 213, an outlet port 215 and an overpressure vent 209.

Inlet port 205 and charging port 206 are in fluid communication with first chamber 207, which has a first outlet 217 and a second outlet 219. First outlet 217 is blocked by a primary valve 221. Primary valve 221 opens in response to a signal (e.g., from the opening of an aircraft exit door in the "armed" condition) to begin the flow of inflation gas from pressure vessel 112 to second chamber 211 via first chamber 207. Second chamber 211 is in fluid communication with outlet port 215 and/or regulator vent 213. Outlet port 215, in turn, is in fluid communication with inflatable evacuation slide 106 (FIG. 1). Regulating piston 225 comprises a piston 224 and a regulator spring 226. Piston 224 moves within second chamber 211 such that the regulating piston 225 allows fluid communication between the second chamber 211 and the outlet port 215 as necessary to regulate the pressure at outlet port 215. Overpressure relief member 223 prevents fluid communication between the first chamber 207 and overpressure vent 209. Overpressure relief member 223 may be a conventional burst disk, check valve or other means to prevent fluid communication between first chamber 207 and overpressure vent 209 below a threshold pressure. If the pressure in first chamber 207 exceeds a predetermined threshold, however, overpressure relief member 223 ruptures (in the case of a burst disk) or opens (in the case of a check valve) to vent the overpressure through overpressure vent 209.

In the illustrative embodiment, control valve 200 includes a fill valve 233 and a fusable plug 235, which are installed in charging port 206. Control valve 200 may also have a second port 237 and a pressure indication device 239 installed in second port 237. The output pressure of the pressure regulation feature of control valve 200 of the illustrative embodiment may be adjustable by means of a threaded regulation spring adjuster 228. Use of a regulating spring adjuster 228 will compensate for tolerances in the spring rate and free height of the regulating spring 226. This is done by moving the regulating spring adjuster 228 either closer to piston 224 to further compress regulating spring 226 or further away from piston 224 to allow the regulator spring 226 to further expand.

In a preferred embodiment, primary valve 221 comprises an electro-explosively operated ball valve in which an electro-explosive piston actuator (not shown) drives a gear rack. The rack, in turn, acts on a pinion gear to rotate the ball valve member from a closed to an open position. There are, however, other primary valve mechanisms that would be suitable. For example, a burst disk with a high rupture pressure could be used for the blocking means. An actuator such as an electro-explosive device (EED) or a spring operated knife blade could be used to rupture the burst disk in response to the external signal. In another example, the primary valve may be a burst disk with a very low burst pressure that is supported by a removable support. Removal of the support would cause the burst disk to rupture at a relatively low fluid pressure.

Figure 3:
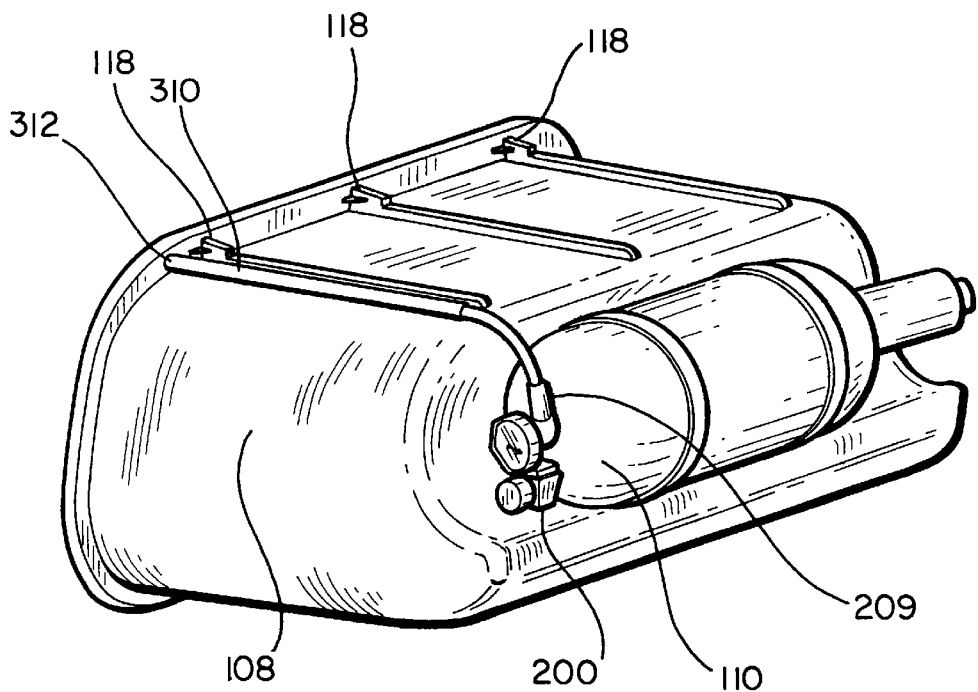
FIG. 3 is a rear perspective view of an inflation system incorporating features of the present invention.

With reference to FIGS. 2 and 3, in the event of an overpressurization of first chamber 207, overpressure relief member 233 will allow the overpressure to be exhausted through overpressure vent 209. Overpressure vent 209 is in fluid communication with conduit 310 which comprises a rigid or rigid/flexible tubular member terminating at an aperture 312 formed in reveal 116 of enclosure 108. Use of conduit 310 in combination with directional overpressure vent 209 permits the overpressure to be safely exhausted outside the enclosure 108.

Figure 4:
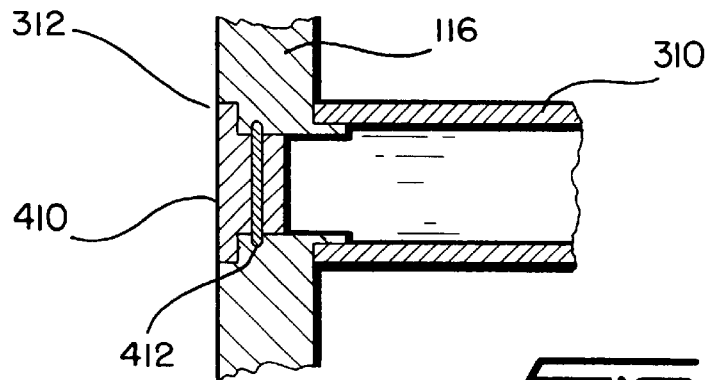
FIG. 4 is a cross-section view of an aperture for venting inflation gas in accordance with the present invention.
Figure 5:
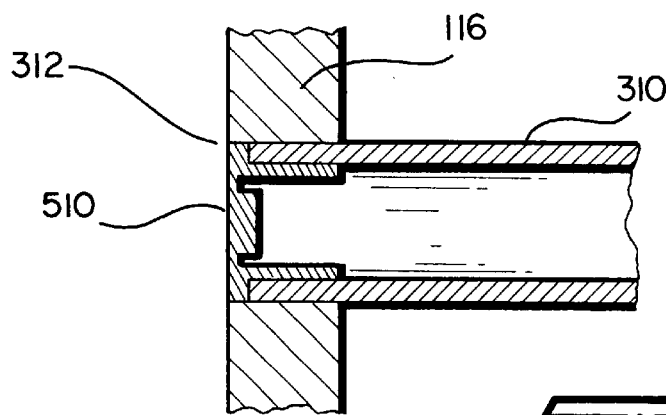
FIG. 5 is a cross-section view of an alternative aperture for venting inflation gas in accordance with the present invention.
Figure 6:
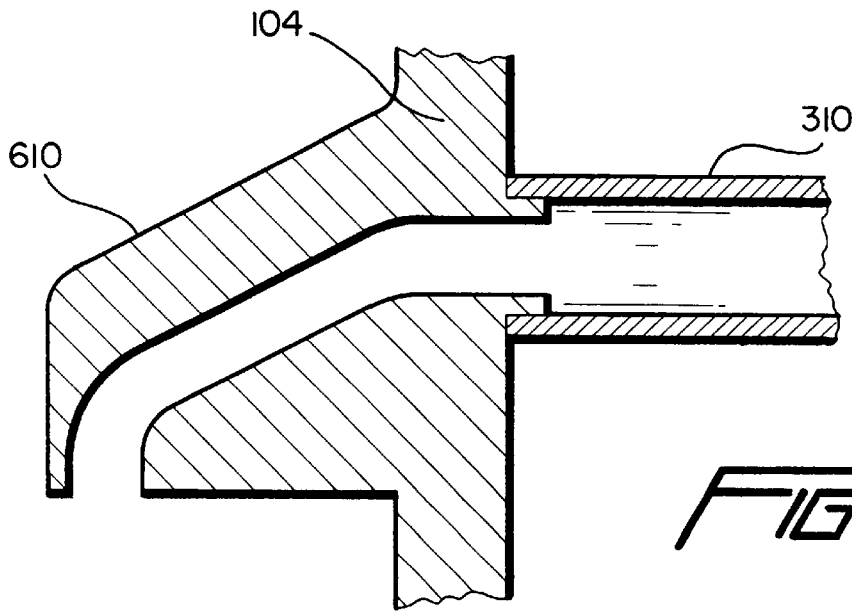
FIG. 6 is a cross-section view of an alternative aperture for venting inflation gas in accordance with the present invention.

With reference to FIG. 4, aperture 312 may be sealed by means of a plug 410 retained either by friction alone or by means of a shear pin 412. Plug 410 prevents moisture and dust from entering aperture 312 and conduit 310. Alternatively as shown in FIG. 5 plug 510 may comprise a frangible plug designed to burst at the appropriate pressure within conduit 310. In another alternative embodiment as shown in FIG. 6, conduit 310 is connected to a drain mast 610 attached to aircraft fuselage 104 in lieu of draining through an aperture 312 in reveal 116 of enclosure 108. Drain mast 610 may or may not include a plug to prevent entry of moisture and dirt into conduit 310.

Although certain illustrative embodiments and methods have been disclosed herein, it will be apparent from the foregoing disclosure to those skilled in the art that variations and modifications of such embodiments and methods may be made without departing from the spirit and scope of the invention. Accordingly, it is intended that the invention shall be limited only to the extent required by the appended claims and the rules and principals of applicable law.

What is claimed is:

1. An inflation system for inflating an inflatable evacuation slide carried in an uninflated condition within an aircraft fuselage, wing or fairing, said inflation system comprising:

a control valve, a conduit, and an overboard venting means;

said control valve comprising a valve body having an inlet port, a first chamber, a primary valve, a primary outlet port, an overpressure relief member, and a secondary outlet port;

said inlet port being fluidically interconnected with said first chamber and adapted to receive a flow of pressurized fluid from a pressure source and deliver said flow of pressurized fluid to said first chamber;

said primary valve being disposed in a fluid path between said first chamber and said primary outlet port, said primary valve opening in responsive to an external signal to permit a flow of pressurized fluid from said first chamber to said primary outlet port;

said primary outlet port being in fluid communication with said inflatable device for delivering said flow of pressurized fluid to said inflatable evacuation slide;

said secondary outlet port providing a fluid path from said first chamber to said conduit;

said overpressure relief member being disposed in said fluid path from said first chamber to through said secondary outlet port, said overpressure relief member blocking fluid flow from said first chamber through said secondary outlet port, said overpressure relief member being moveable in response to fluid pressure in said first chamber exceeding a predetermined threshold to permit fluid flow through said secondary outlet port;

said conduit comprising a tubular member in fluid communication with said secondary outlet port for conveying a fluid flow from said secondary outlet port to said overboard venting means, and said overboard venting means comprising an aperture passing through said aircraft fuselage.

2. The inflation system of claim 1, further comprising:

a burst plug, said burst plug comprising a frangible plug disposed in said aperture passing through said aircraft fuselage.

3. The inflation system of claim 1, further comprising:

a solid plug disposed in said aperture passing through said aircraft fuselage.

4. The inflation system of claim 3, wherein:

said solid plug is retained in said aperture by means of a shear pin.

5. The inflation system of claim 3, wherein:

said solid plug is retained in said aperture by means of a friction fit.

6. The inflation system of claim 1, further comprising:

a drain mast mounted to said aircraft fuselage for providing an overboard vent distal of an outer surface of said aircraft fuselage.

7. The inflation system of claim 1, wherein:

said overpressure relief member comprises a rupture disk.

8. The inflation system of claim 1, wherein:

said overpressure relief member comprises a check valve.

9. The inflation system of claim 1, further comprising:

a gas source, said gas source comprising a pressure vessel having a pressurized gas contained therein.

10. The inflation system of claim 1, further comprising:

an enclosure for containing said inflatable evacuation slide, said enclosure comprising a housing having a mounting flange and an enclosure door, wherein said aperture passing through said aircraft fuselage comprises an aperture disposed in said mounting flange.

11. The inflation system of claim 1, further comprising:

an enclosure for containing said inflatable evacuation slide, said enclosure comprising a housing having a mounting flange and an enclosure door, wherein said aperture passing through said aircraft fuselage comprises an aperture disposed in said enclosure door.

12. An inflation system for inflating an inflatable evacuation slide carried in an uninflated condition within the contour of an aircraft skin, said inflation system comprising:

an enclosure adapted to be mounted within said contour of an aircraft skin having an opening substantially flush with an exterior surface of said aircraft fuselage;

an enclosure door covering said opening;

a pressure vessel for storing a source of pressurized gas a control valve; and a conduit;

said control valve comprising a valve body having an inlet port, a first chamber, a primary valve, a primary outlet port, and a secondary outlet port;

said inlet port being fluidically interconnected with said first chamber and adapted to receive a flow of pressurized fluid from said pressure vessel and to deliver said flow of pressurized fluid to said first chamber;

said primary valve being disposed in a fluid path between said first chamber and said primary outlet port, said primary valve being responsive to a trigger for providing a flow of pressurized fluid from said first chamber to said primary outlet port, said primary outlet port being in fluid communication with said inflatable evacuation slide for delivering said flow of pressurized fluid to said inflatable evacuation slide;

said secondary outlet port being fluidically interconnected with said first chamber and having an overpressure relief member blocking a fluid flow from said first chamber through said secondary outlet port, said overpressure relief member being moveable in response to fluid pressure within said first chamber exceeding a predetermined threshold to permit fluid flow through said secondary outlet port;

said conduit comprising a tubular member in fluid communication with said secondary outlet port for conveying a fluid flow from said secondary outlet port to an aperture in said aircraft skin.

\* \* \* \* \*